Patented Nov. 23, 1943

2,334,996

UNITED STATES PATENT OFFICE 2,334,996

THICKENED OIL COMPOSITION

Garland H. B. Davis, Elizabeth, N. J., assignor, by mesne assignments, to Jasco, Incorporated, a corporation of Louisiana No Drawing. Application June 29, 1940, Serial No. 343,157. In France August 18, 1939

7 Claims. (Cl. 252—59)

The present invention relates particularly to thickened oil products, and more particularly to improved lubricants comprising oleaginous mixtures comprising hydrocarbons and/or fatty compounds, and to a process for making such products.

It has already been proposed to improve hydrocarbon oils by adding to them small amounts of highly polymerized hydrocarbons having high molecular weights of more than 800 or 1,000, and preferably of the order of 10,000 to 100,000, or higher. These polymerized hydrocarbons are, in general, linear hydrocarbon polmers, such as iso-mono-olefin polymers, in particular polymerized isobutene or polybutenes and polypentenes. Likewise, polymers of normal mono-olefins, such as ethylene polymers, made under high pressure, hydrogenated polymerized diolefins, particularly hydrogenated polymers of butadienes and hydro rubber are other examples of materials of this type.

These various materials are substantially pure hydrocarbons and are very useful thickening agents for hydrocarbon lubricating oils, as well as useful for other purposes, but the applicability of these products to various industrial uses is limited on account of their lack of solubility in oxygen-containing solvents, such as alcohols, ketones, acids, esters, ethers and the like, and on account of their incompatibility with high molecular weight oxygen-containing organic compounds, such as resins, fatty compounds and the like.

It was therefore found desirable to produce materials which have some of the essential properties of the described linear hydrocarbon polymers but which, at the same time, are more soluble in oxygen-containing solvents and compatible with oxygen-containing organic compounds, yet which, nevertheless, are to a substantial extent also soluble in hydrocarbon oils. It is the object of this invention to provide useful compositions comprising thus modified linear hydrocarbon polymers having these solubility characteristics while preserving their valuable elastic properties, chemical stability, thickening potency, and imparting to them additional qualities identified with preferred oiliness carriers or polar wetting agents.

It has been found that the high molecular weight hydrocarbon polymers can thus be modified by first preparing the hydrocarbon polymers which have been discussed and then subjecting them to an oxidation treatment designed to incorporate a certain amount of oxygen.

One of the features of the linear hydrocarbon polymers is their marked stability toward oxidation by air or molecular oxygen. This is evidently due to their substantially saturated nature with respect to hydrogen as indicated by their very low iodine numbers, i. e., iodine numbers below about 25, and more particularly less than about 7. In general, these polymers are characterized as polymeric homologous compounds having substantially the compositional formula $C_nH_{2n}$. The higher the molecular weight, the more chemically inert are these polymers, and their unsaturation becomes vanishingly small, since they have on the average less than about 1 double bond in a chain of 200 or more carbon atoms. They are substantially not affected by sulfuric acid, and for the most part, even by sulfurization and many other chemical treatments. Only with particular care can they be partially oxygenated to form the desired suitable blending products. To accomplish this, it is found that certain oxidizing agents may be used under carefully controlled conditions which will be hereinafter described. The oxidizing agents may be more particularly termed chemical oxidizing agents which undergo decomposition in giving off atomic oxygen for the oxidation reaction, for example: nitric acid, nitric oxides, as well as ozone, dichromates, permanganates and the like.

The linear polymeric hydrocarbon compounds of mono-olefins may be broadly termed polyalkenes. This broad class includes analogous polymers: polyethene, polypropene, polybutenes and polypentenes, all of which are similarly stable, susceptible to similar oxidation treatment and characteristically substantially saturated linear hydrocarbon polymers, but of these polyalkenes, the preferred types are branched chain linear compounds, which are formed particularly from an iso-mono-olefin, for example, especially isobutene. The preferred branched linear polymers have a structure corresponding to a long chain of saturated carbon atoms containing a number of short alkyl side chains such as methyl or butyl groups.

The polybutenes may be prepared commercially from a mixture of isobutene and varying percentages of normal butenes, but are derived essentially from the isobutene. It will be understood that the preparation of the high molecular weight polymeric hydrocarbon compounds does not form a part of this invention, and various known methods for producing the hydrocarbon polymers may be used. For example, a polybutene polymer having molecular weight range from 800 to 250,000 or more is obtained by contacting the isobutene reactant material with boron fluoride at a temperature range from −10° C. to −100° C. or lower, the molecular weight depending upon the purity of the reactant, the polymerization temperature and other known controlling conditions.

The hydrocarbon polymer to be treated for accomplishing the controlled oxygenation is first brought into solution in a suitable solvent, preferably a saturated aliphatic hydrocarbon, such as a liquid paraffin, e. g. hexane, naphtha, kerosene or the like, or with a non-reactive solvent such as carbon tetrachloride, and this solution is then agitated or mixed with the chemical oxidizing agent at an elevated temperature, or, if desired, the solution may be passed through a heated tube with the oxidizing agent.

As stated above, the substantially saturated polymers are normally resistant to oxidation especially with air and the conditions of oxidation with even the various suitable oxidizing agents are necessarily severe, depending to some extent on the amount of oxygen incorporation desired.

The temperature, time and amount of oxidizing agent may be varied, and in this way, various amounts of oxygen may be introduced, up to about 30% at the most but, generally speaking, considerably less oxidation will make the polymers soluble in the most common oxygen-containing solvents.

The time of reaction necessarily depends on other facts and may be compensated for by adjustment of these other factors, but, in general, one hour or more is recommended and in some instances as much as 4 to 10 hours are required.

Temperature, again, depends on the strength or concentration of the oxidation agent, but generally temperatures of at least about 75° F. to about 225° F. are required and should not be allowed to go above about 250° F. so as to prevent too excessive depolymerization.

When using nitric acid as the oxidizing agent, commercial concentrated acid of 1.42 gravity may be used successfully, but weaker acids have been employed. It is desirable also to use mixtures of concentrated nitric and sulfuric acid, but the amount of sulfuric acid should not be increased too much, because it has a marked tendency to cause depolymerization. It is desirable to have less than 50% or 30% of sulfuric acid in the mixture. It is also found that the higher the molecular weight of the essential material the more easily it is degraded or depolymerized, so that when it is desired to obtain the highest possible molecular weight oxygenated product it is preferred to omit sulfuric acid.

As stated before, other oxidizing agents may be used, such as ozone, permanganate or dichromate, but of all these, nitric acid is the preferred oxidizing agent. These are broadly described as oxidizing agents which form nascent oxygen to distinguish them from air or molecular oxygen, which are undesirable.

The oxygenated product does not greatly differ in appearance from the initial hydrocarbon polymer material; it remains clear but usually takes on a faint yellow color. The consistency of the product depends to some extent on the original polymer and, also, on the amount of depolymerization effected through oxidation. Thus, an original solid polymer having a molecular weight of about 100,000 is carefully treated so as to minimize degradation so that the product is solid after oxidation, while a product of 20,000 to 30,000 original molecular weight, which is normally a plastic solid when treated under similar conditions, is converted into a viscous liquid.

The amount of nitrogen introduced during the oxidation with nitric acid is quite small: in almost every case less than 0.25%. The nature of the chemical group formed by the oxidation is not clear at the present time. A small amount of acid is formed during the treatment and increased during the oxidation, but the amount of oxygen appearing in the form of carboxyl groups is estimated to be less than 10% of the total oxygen absorbed. Acetyl values are low, indicating that hydroxyl groups are not formed to any great extent. Qualitative evidence indicates that the oxygen may be largely in the form of the carbonyl group, but as yet there is no complete analytical determination.

The solubility properties of the oxidized material are of the greatest interest. The hydrocarbon polymers, as stated before, are not soluble in most oxygen-containing solvents such as ethyl ether, ethyl alcohol, acetone, and other low molecular weight ethers, alcohols, and ketones. They are insoluble in acetic and similar acids, but oxidation to a limited extent, for example 4% to 6%, is sufficient to make the modified polymers soluble in ethyl ether. About 15% of oxygen is sufficient to make them soluble in amyl acetate and similar ester solvents, while it is necessary to incorporate about 26% to 30% of oxygen in order to make them soluble in acids and ketones. All of the products are soluble, however, in petroleum ether and other hydrocarbon solvents even after oxidation.

These oxygenated polymers are likewise compatible with a great many high molecular weight oxygen-containing substances with which the hydrocarbon polymer is incompatible. Among the various resins with which the modified polymers are compatible may be noted the natural resins such as rosin, ester gums, oleo resins, oil-soluble phenolic and modified alkyd resins, etc., more specifically there may be mentioned colophony and rosin oils. Various synthetic resins may also be mixed with the polymers, and among these may be mentioned the phenol-aldehyde resins, aldehyde polymer resins, ketone resins and their various modified forms.

The oxygenated polymers are compatible with various cellulose esters and other cellulose derivatives, e. g. ethers, acetates, or similar esters and are very useful in giving such mixtures softness and a degree of elasticity.

The oxidized polymers are also miscible with the unmodified polymers and other rubbery materials at least up to the extent of 30% to 40%, and these mixtures are likewise useful.

The nature of the present products and their methods of manufacture are illustrated by the following examples.

EXAMPLE 1

400 grams of polymerized isobutylene, or polybutenes, having an average molecular weight of 13,000, as measured by the Staudinger viscosity method, were mixed with 600 grams of an oxidizing agent consisting of 480 parts, by weight, of nitric acid (80%) and 120 parts, by weight, of sulfuric acid (20%). This mixture was heated to 240° F., at which temperature the mixture boiled or gave the appearance of boiling. This treatment was continued for 72 hours, then the mixture was diluted with water and an oily product separated from the aqueous layer. The oily product was thoroughly washed leaving a very viscous, slightly yellow, oily material which had a molecular weight of 12,500 and contained 28% of oxygen but had a nitrogen content of less than 0.25%.

This oxidation product was soluble in ethyl ether, ethyl alcohol, amyl acetate, and acetic acid, also it was found to be soluble in various hydrocarbon solvents and viscous petroleum oils. It was relatively stable, but if heated to a temperature of 125° C., gradually darkened and finally charred. The product was only slightly acid and had a low acetyl value, below 5.0. If desired, the product may be given a treatment such as esterification or saponification to lower its acidity. It was compatible with nitrocellulose, cellulose ether, as well as with various oxygen-containing materials; for example, the oxidized polymer was found to be miscible in equal proportions with nitrocellulose, ethyl cellulose, with rosin and with candelilla wax.

EXAMPLE 2

The procedure of Example 1 was repeated but oxidation was continued for 2 hours longer and a first sample was taken. Oxidation was then resumed for 16 hours longer; and a second sample was taken. After a further oxidation for 72 hours a third sample was taken. Three samples were analyzed and No. 1 was found to contain 6.2% of oxygen; sample No. 2, 24.2%; and sample No. 3, 30% of oxygen. Sample Nos. 1 and 2 showed the following analyses:

*Table I*

| Sample | Acid number | Acetyl value |
|---|---|---|
| 1 | 12.5 | None |
| 2 | 67.7 | 3.2 |

Solubility of these samples in various materials is summed up in the following table:

*Table II*

| Sample | Oxygen | Petroleum ether | Ethyl ether | Amyl acetate | Acetone | Acetic acid |
|---|---|---|---|---|---|---|
| | Per cent | | | | | |
| 1 | 6.2 | Soluble | Soluble | Insoluble | Insoluble | Insoluble. |
| 2 | 24.2 | do | do | Soluble | Insoluble | Do. |
| 3 | 26.0 | do | do | do | Soluble | Soluble. |

EXAMPLE 3

Iso-olefin polymers having an average molecular weight of 60,000 to 80,000 were dissolved in carbon tetrachloride to give a 6% solution. Ozonized air produced by a laboratory ozonizer was passed through the solution for 2 hours at 75° F. The solvent was removed from the product which was found to contain 15% of oxygen, and the product was similar to the materials produced by nitric acid oxidation.

EXAMPLE 4

Polybutene was oxidized with nitric acid to a degree sufficient to incorporate 20% of oxygen. Ten parts by weight of nitro cellulose and 10 parts of the oxidized polybutene were then dissolved in a mixture of 40 parts of butyl acetate, 20 parts of ethyl acetate, and 40 parts toluene. The materials were freely miscible and made a homogeneous film when the solvent was allowed to evaporate. To 10 parts of ethyl cellulose were added 10 parts of oxidized polybutene, and the mixture was taken up in a solvent composed of 30 parts ethyl acetate and 30 parts toluene. This, likewise, gave a clear homogeneous film as the solvent was evaporated.

Non-oxidized polybutene was not compatible with either nitrocellulose or with ethyl cellulose.

A very important use of the oxidized polymers arises from the fact that they have a certain desirable lubricating character and at the same time have the property of improving viscosity characteristics of and thickening viscous oils. Rather surprisingly, these oxidized polymers form stable blends with hydrocarbon lubricating oils and effect substantial improvement in the viscosity characteristics of such blends when added in small amounts. Thus, by adding from about 1% to about 10% of the oxygenated polymer to a hydrocarbon lubricating oil, the viscosity of the blend is substantially increased over a lower temperature range to thereby flatten the temperature viscosity curve of the mixture. The upper limit of the amount of oxidized polymer added varies with the nature of the addition and with the other ingredients blended. Up to about 20% to 30% of the oxidized polymer may be added with very good results. Additions of larger amounts may lead to a viscosity that is excessive for practical purposes.

The following examples will further illustrate the nature of this invention with respect to the utilization of the oxidized polymer as a blending agent in improving the viscosity characteristics of a lubricating oil:

Certain percentages of oxidized polymer products formed in accordance with the given described examples were added to samples of a hydrocarbon lubricating oil and the blends thus formed, as well as the unblended hydrocarbon lubricating oil, used as a blank, were subjected to viscosity determinations from which viscosity index improvement was determined, as defined by E. W. Dean and G. H. B. Davis in "Chemical and Metallurgical" volume 36, pages 618 to 619 (1929).

The following table presents the data on these tests:

*Table III*

| Composition | Oxidized polymer added | Saybolt vis. 100° F. | Saybolt vis. 210° F. | V. I. |
|---|---|---|---|---|
| Blank (S. A. E. 20W hydrocarbon lubricating oil) | Per cent None | 275.8 | 45.9 | 13 |
| Blank+oxidized polybutene (containing 24% oxygen) | 2 | 276.4 | 46.3 | 24 |
| | 5 | 329.6 | 48.7 | 33 |
| | 10 | 374.6 | 50.6 | 40 |
| Blank+oxidized polymers (containing 28% oxygen) | 2 | 312.6 | 48.5 | 41 |
| | 5 | 419.9 | 54.4 | 63 |
| | 10 | 584.5 | 62.3 | 71 |

It is to be noted from the foregoing table on the viscosity improving effect of the oxidized polybutene, that this material is capable of substantially thickening the hydrocarbon oil, and thereby gives an improvement in the viscosity index of the blend amounting to from about 100% to 300% with the lower oxygen content and from about 300% to 500% for the oxidized polymer of slightly higher oxygen content. Further, this data illustrates that this oxidized polymer can be incorporated in the oil in relatively high amounts, and that a fairly uniform improvement is obtained as the amounts of the incorporated oxidized polymer are increased.

Accordingly, the oxidized linear polymer may also be used to thicken various hydrocarbon products which are relatively more or less viscous than an S. A. E. 20W oil. For example, they may be used in thickening volatile hydrocarbon fraction such as petroleum ether, naphtha, mineral seal oil, Diesel fuels, industrial oils, motor oils, waxes, asphalts, etc., and in view of their compatibility with oxygen-containing compounds such as fatty oils, soaps, resins of various descriptions, and various common oxygen-containing additives for oil products, they can be usefully combined with such materials or with mixtures of such materials and the mentioned hydrocarbon oils, being mutually soluble in both types of materials. This characteristic of the oxidized polymers is highly advantageous in the formulating of many commercially useful products, particularly those in which hydrocarbon vehicles and oxygen-containing compounding agents are to be employed. As an illustration, the oxidized polymers may be used in paints, lacquers or inks in a mixture with a hydrocarbon oil as a diluent or thinner and may be compounded with pigments of dyes, resins or waxes, as well as fatty oils, including drying oils. The oxidized polymer in such compositions imparts flexibility to the dried coating and thickens the material which is to be applied without giving the mixture a tendency to harden or gum too readily as in the case of oxidized oils. The oxidized polymers also permit satisfactory use of inexpensive hydrocarbon solvents to a greater degree in these compositions.

It has been found from many experiments on the blending value of the partially oxygenated polymers that the branched linear polymers are more useful in being relatively more compatible with hydrocarbon than are the other oxidized polymers. Furthermore, the oxygen-containing polymers of isobutene have particularly high thickening power which can be ascribed to the high molecular weights of these products. As indicated by many tests such as those used for illustration, it is desirable that the oxygenated polymers have a molecular weight above 800 or 1,000 and have a chemically combined oxygen content of at least 4% by weight of the oxygenated polymer. For increased thickening power and miscibility with fatty compounds, the oxygen content should preferably be still higher, e. g., the oxygen content ranging upwardly to about 30%, and the molecular weight should be preferably from about 5,000 to 50,000, or higher. These preferred thickeners are readily obtained by the oxidation treatment of polybutene or similar iso-olefin polymers. However, for some purposes the relatively lower molecular weight and lower oxygen-containing modified polymers are of equal value as for example for plasticizing resins or for forming homogeneous compositions with various oxygen-containing organic solvents.

Using the oxidized polymers to thicken lubricating products, they are to be used mainly in industrial oils which are employed at moderate temperatures as, for example, temperatures below 250° F. since at such temperatures the oxidized polymers are suitably stable. Thus, they are to be employed in greases, textile oils, etc., as in combination with fatty oils, volitalized oils, soaps, etc. The compositions may also contain dyes and various known additives, such as stabilizing agents, oxidation inhibitors, pour point depressants, burning quality promotors and corrosion inhibitors. For a number of uses the compositions may also contain pigments or solid fillers.

This application is a continuation-in-part of my earlier application Serial Number 234,965, filed on October 14, 1938, which relates particularly to the oxygenated polymer product and the process for producing the same.

The present invention is not to be limited by any theory on the modification of the polymers by oxidation nor by any specific oxidizing agent, nor by any specific use of the oxidized polymers, but only by the following claims in which it is desired to claim all novelty inherent in the invention.

I claim:

1. A composition of matter comprising a lubricating oil and an addition of at least 0.5% by weight of a high molecular weight, substantially saturated, linear, iso-olefinic hydrocarbon polymer, of plastic consistency normally resistant to oxygen and having a molecular weight above 10,000, modified by oxidation to incorporate therein a substantial amount of chemically combined oxygen.

2. A composition of matter comprising a lubricating oil and an addition of at least 0.5% by weight of oxygenated polybutene of plastic consistency having a molecular weight above 10,000.

3. A thickened lubricant of improved viscosity characteristics, comprising a hydrocarbon lubricating oil blended with from 2% to 20% by weight of an oxygenated iso-olefin linear polymer having a molecular weight above 10,000 and containing from about 20% to 30% of oxygen by weight.

4. A composition as described in claim 3, in which the iso-olefin polymer is a polymer of isobutene.

5. A thickened oil composition of improved viscosity characteristics, comprising a hydrocarbon lubricating oil blended with from 2% to 20% by weight of an oxygenated linear polymer of isobutylene having the molecular weight above 10,000 and containing from about 4% to about 30% by weight of combined oxygen, said oxygenated polymer having an acid number between about 12.5 and 67.7 and an acetyl value between about 0 and 3.2

6. A thickened lubricant comprising a hydrocarbon lubricating oil blended with a viscosity index improving amount of an oxygenated plastic solid polymer of isobutylene, said polymer of isobutylene being a linear hydrocarbon polymer characterized by having on the average less than about one double bond in a linear chain of at least 200 carbon atoms and being normally resistant to oxidation by molecular oxygen, the oxygenated polymer having a molecular weight substantially above 10,000, an oxygen content of at least about 15% by weight but the amount of the combined oxygen in the form of carboxyl groups being less than 10% of the total combined oxygen.

7. A thickened lubricant as described in claim 6, comprising a fatty compound ingredient.

GARLAND H. B. DAVIS.